Feb. 25, 1941.    W. W. MAHER    2,232,711
CAN TESTING APPARATUS
Filed Nov. 18, 1936    8 Sheets-Sheet 1

INVENTOR
William W. Maher
BY
ATTORNEYS

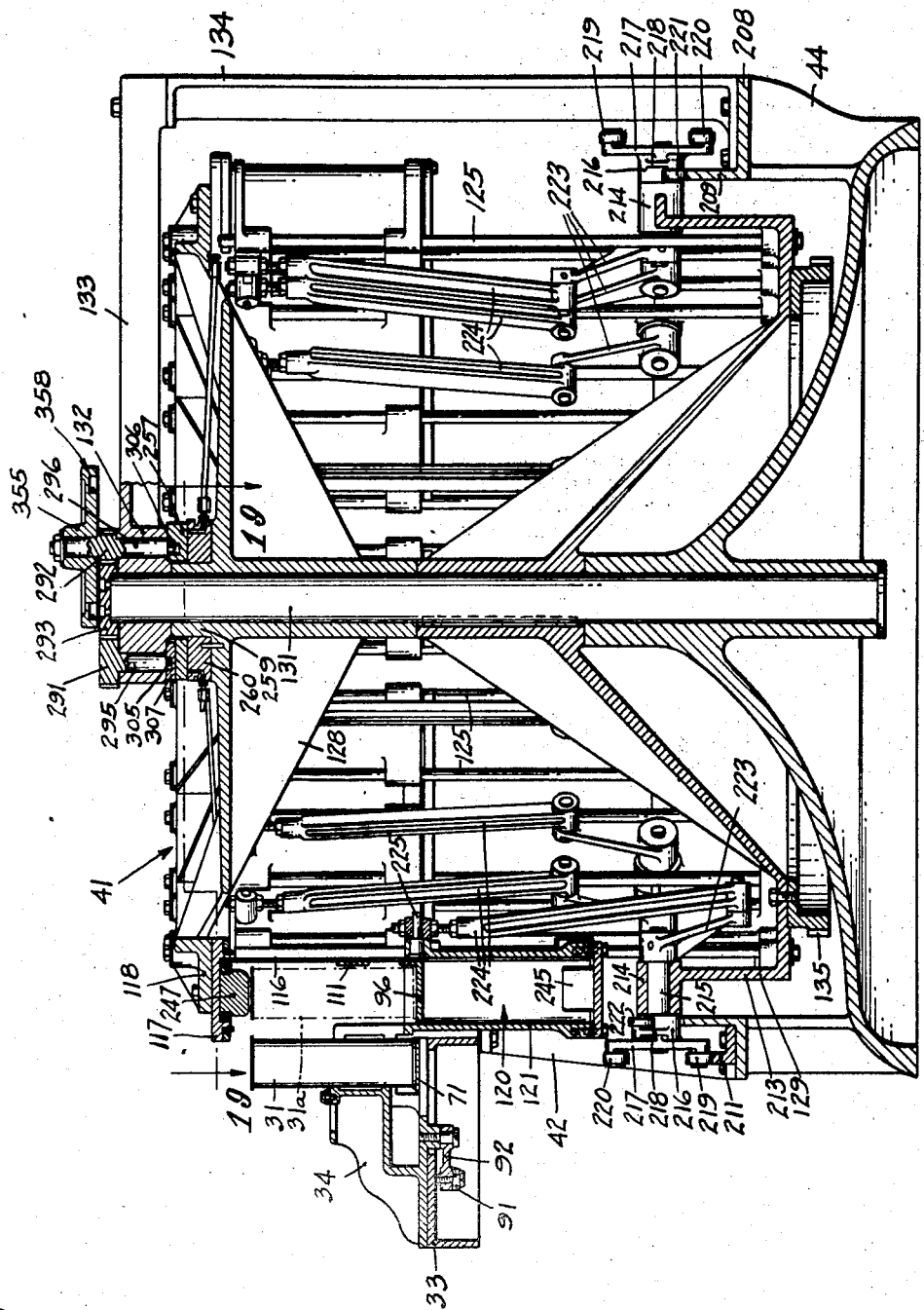

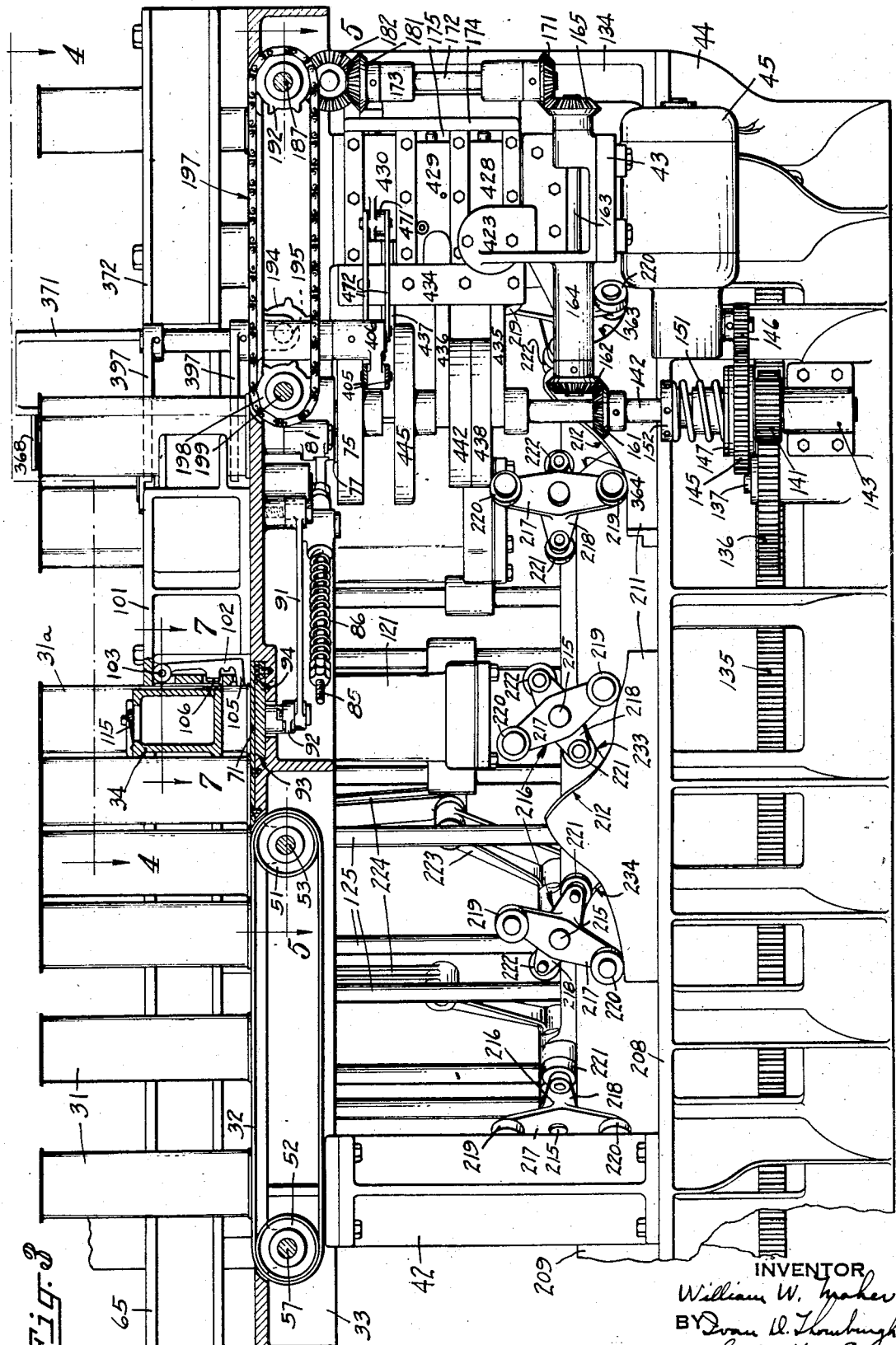

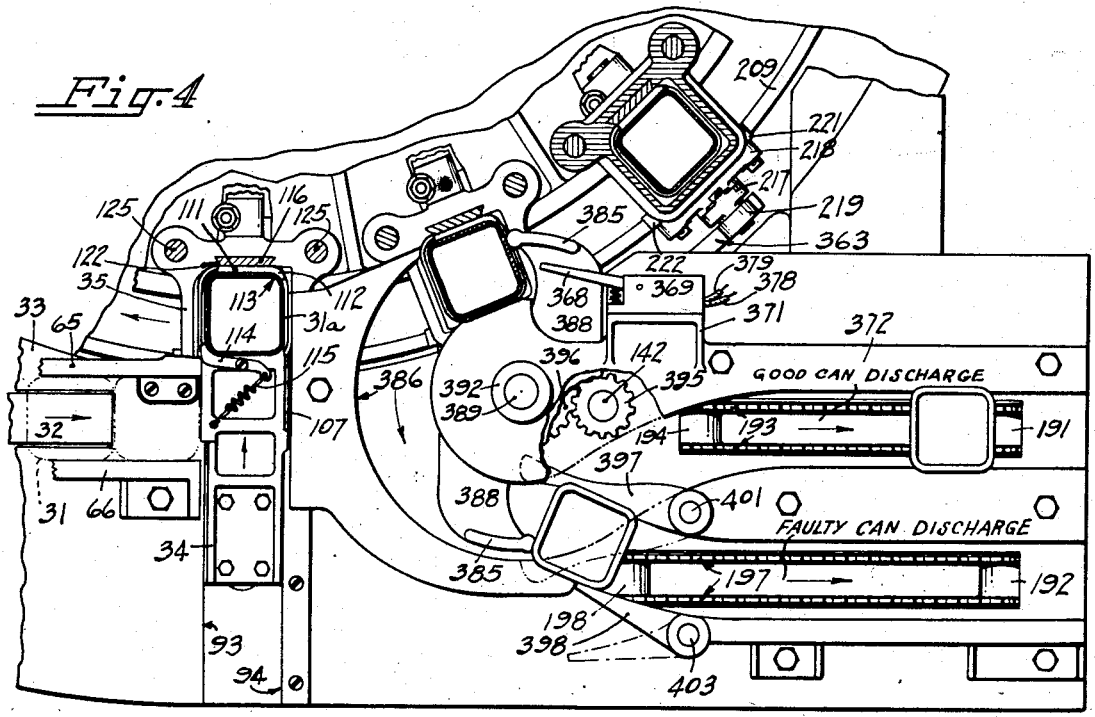
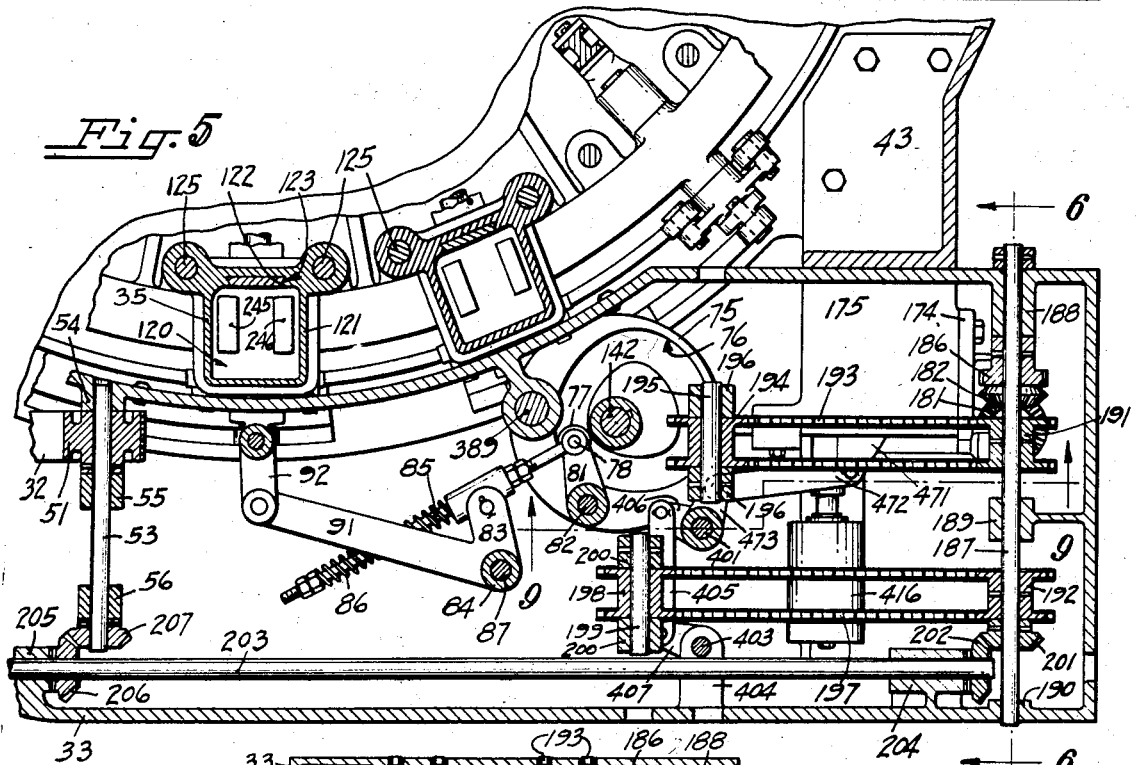
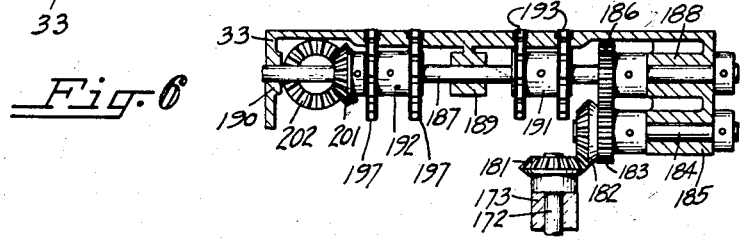

Feb. 25, 1941.  W. W. MAHER  2,232,711
CAN TESTING APPARATUS
Filed Nov. 18, 1936   8 Sheets-Sheet 5
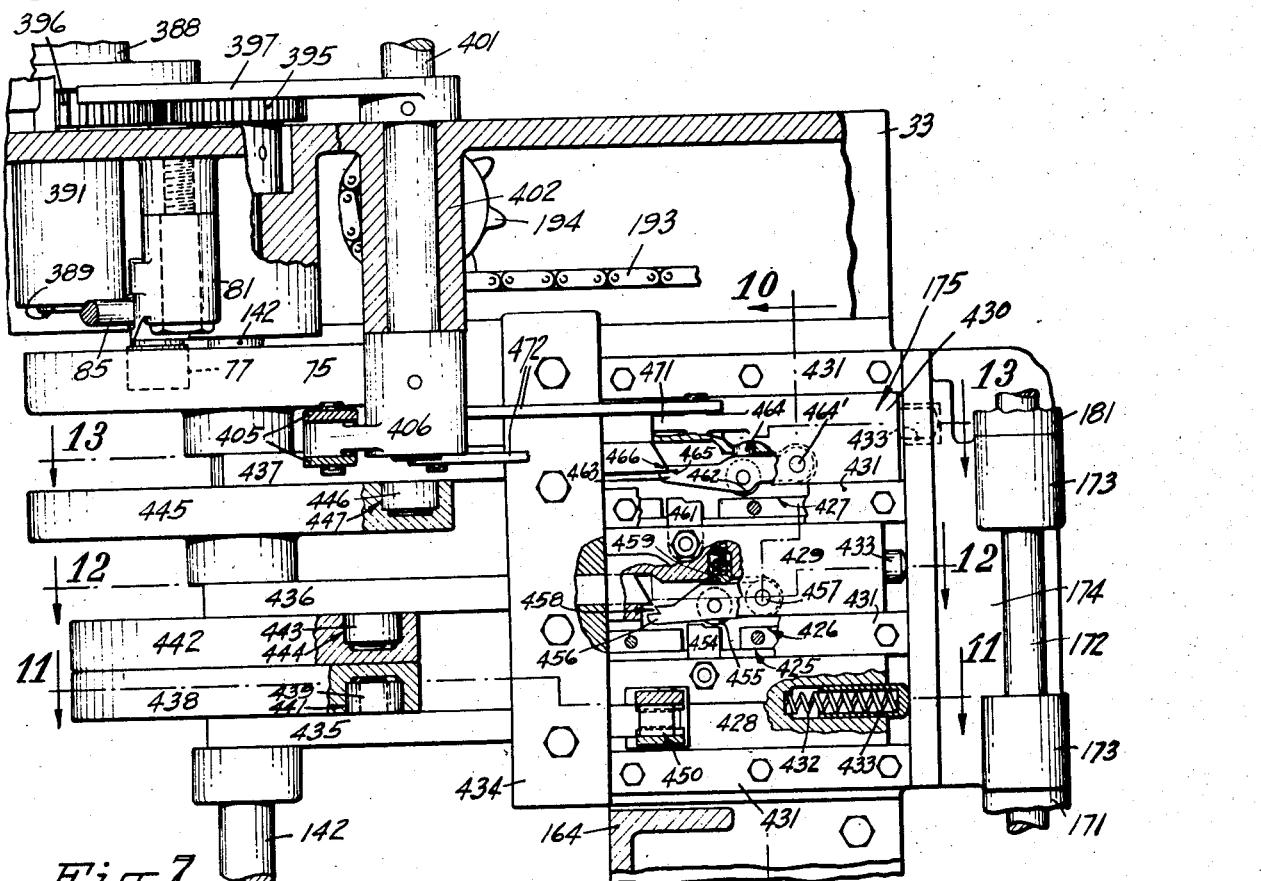
Fig. 9
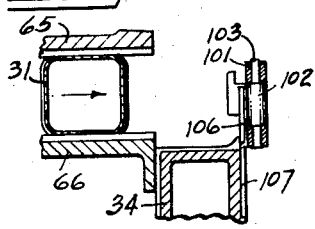
Fig. 7
Fig. 8
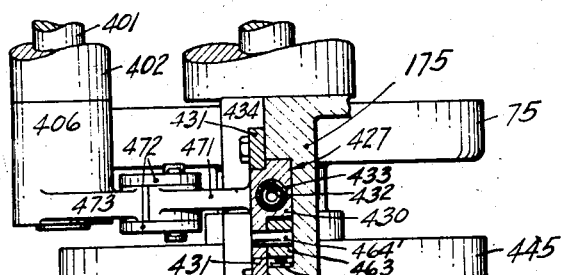
Fig. 10
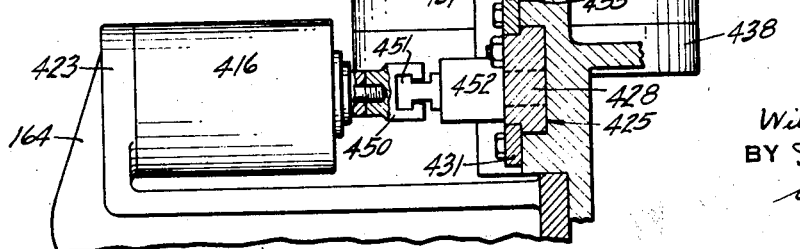
INVENTOR
William W. Maher
BY Ivan D. Thornburgh
Charles H. Clay
ATTORNEYS Feb. 25, 1941.  W. W. MAHER  2,232,711

CAN TESTING APPARATUS

Filed Nov. 18, 1936   8 Sheets-Sheet 6

INVENTOR
William W. Maher
BY
ATTORNEYS

Feb. 25, 1941.　　　　W. W. MAHER　　　　2,232,711
CAN TESTING APPARATUS
Filed Nov. 18, 1936　　　　8 Sheets-Sheet 7
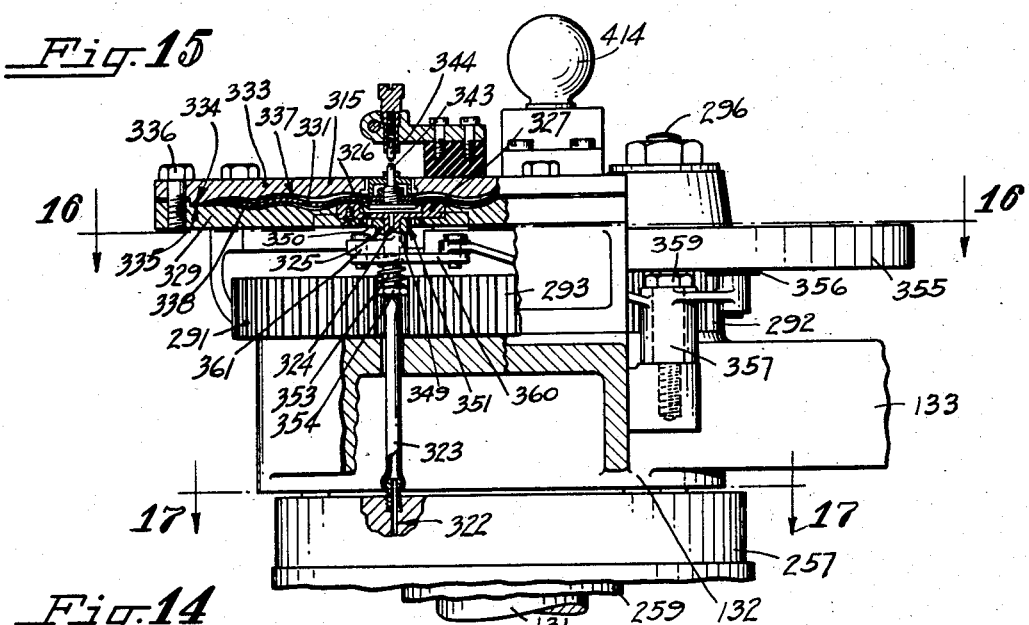
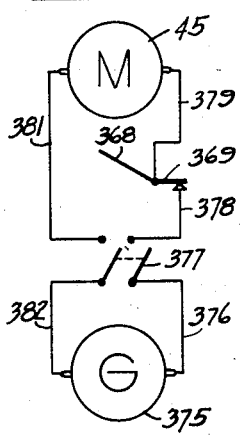
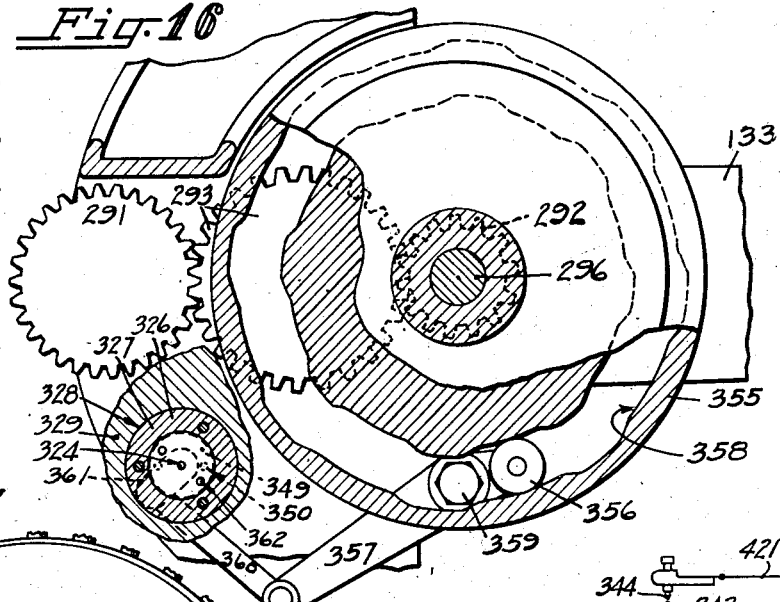
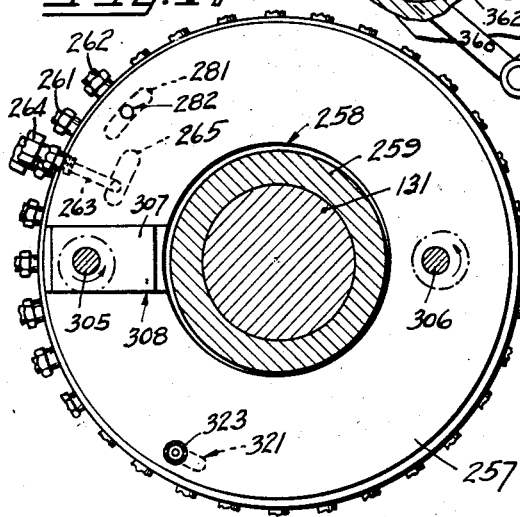
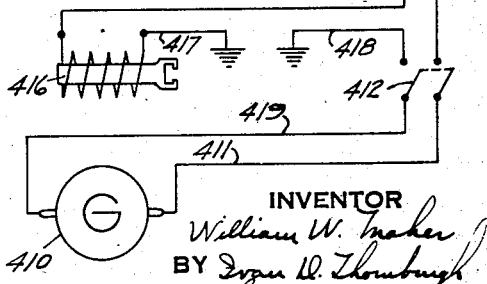
INVENTOR
William W. Maher
BY Ivan D. Thornburgh
Charles H. Ernst
ATTORNEYS

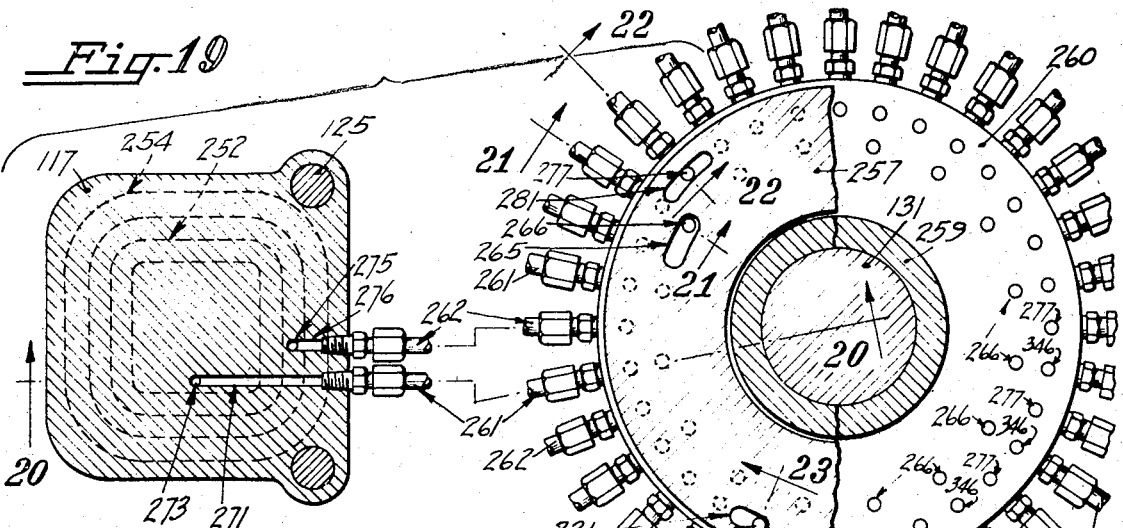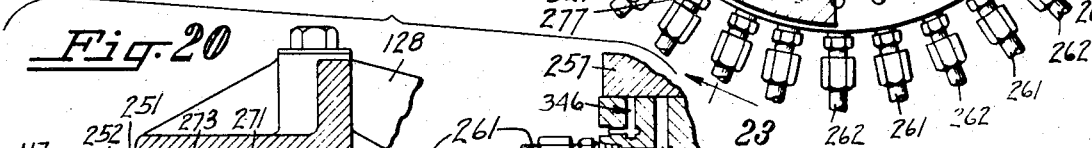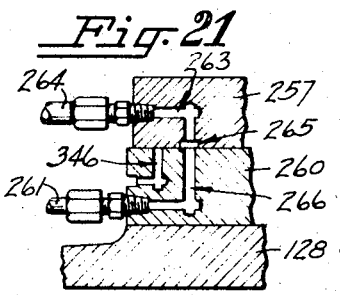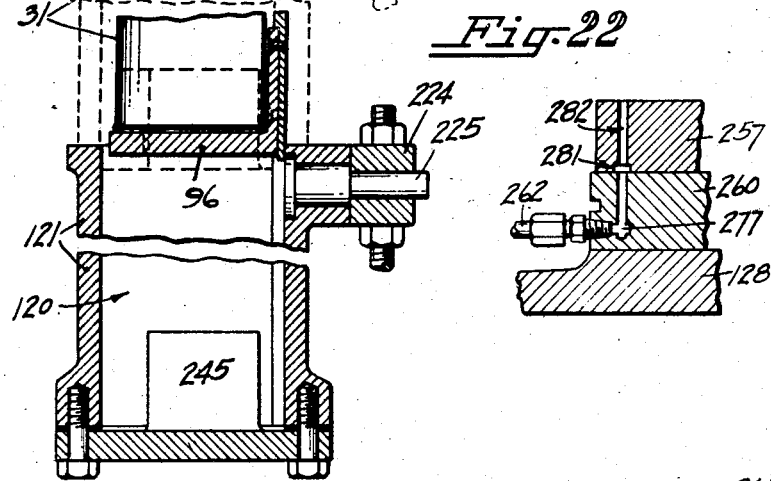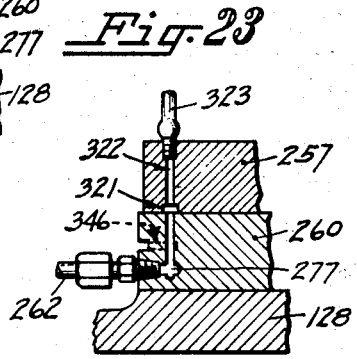

Patented Feb. 25, 1941

2,232,711

UNITED STATES PATENT OFFICE 2,232,711

CAN TESTING APPARATUS

William W. Maher, San Francisco, Calif., assignor to American Can Company, New York, N. Y., a corporation of New Jersey Application November 18, 1936, Serial No. 111,526

14 Claims. (Cl. 73—51)

The present invention relates to can testers which utilize the principle of leaky can ejection as effected by air pressure differences between the interior of a leaky can under test and a surrounding chamber and has particular reference to the use of a testing chamber which is set at atmospheric pressure for each testing operation while the interior of the can is subjected to a pressure in excess of atmosphere, there being a simultaneous sealing of both can and chamber with provision for minimizing error while increasing rapidity of testing.

In vacuum or air pressure can testers utilizing air pressure differences between can interior and exterior considerable variation of pressures necessarily takes place in the usual air line supplying the machines and where testing requirements are exact, that is, where cans having very small leaks are to be segregated, it has been found very difficult and indeed commercially impossible to always supply the exact air pressures required on the two sides of the can, temperature changes, bulging or contraction of the can walls when the air pressures are established, throwing out of adjustment any sensitive devices depending upon exact pressure differences.

The apparatus of the present invention is not dependent upon small pressure differences for operation since atmospheric pressure is used for the testing chamber and a greater air pressure, which may vary to some extent, is used in the actual test.

An important object of the present invention therefore is the provision of a testing apparatus which automatically receives an empty can, seals the can in a testing head at the same time enclosing the can in a surrounding sealed chamber which is equalized with atmospheric pressure for the testing operation and which after testing, automatically separates at a subsequent time the leaky cans from those which do not leak, the apparatus utilizing the actual pressure in the interior of the surrounding chamber for the test.

Another object of the invention is the provision of a can feeding mechanism for a testing apparatus which operates for feeding only when a can is in suitable position to be received within the testing chamber of the apparatus.

Still another object is the provision in such a can testing apparatus, of can feeding devices and can handling elements by means of which the cans are retained in upright position, their flanges and other parts being protected against damage during their passage through the machine.

Yet another object is the provision of a detecting apparatus for a can testing machine which operates to insure proper passage of a can through the machine and which stops operation of the machine if there is failure of the proper can travel.

Numerous other objects and advantages of the invention will be apparent as it is better understood from the following description, which, taken in connection with the accompanying drawings, discloses a preferred embodiment thereof.

Referring to the drawings:

Fig. 2 is a vertical section taken substantially along the line 2—2 of Fig. 1;

Fig. 3 is a sectional view taken substantially along the broken line 3—3 of Fig. 1 and showing in large part the front elevation of the tester the parts above the cans being omitted;

Fig. 4 is a part plan and a part section as viewed substantially along the broken line 4—4 of Fig. 3 and drawn to a larger scale;

Fig. 5 is a plan, sectional view, taken substantially along the line 5—5 of Fig. 3;

Fig. 6 is a sectional detail taken substantially along the line 6—6 of Fig. 5;

Figs. 7 and 8 are fragmentary plan sections taken along the line 7—7 in Fig. 3 and showing parts of the can feed in different positions;

Fig. 9 is an elevational section taken substantially along the broken line 9—9 of Fig. 5, parts being broken away to disclose certain internal features;

Fig. 10 is a fragmentary vertical section of a can deflector delay mechanism taken substantially along the broken line 10—10 of Fig. 9;

Figure 1:
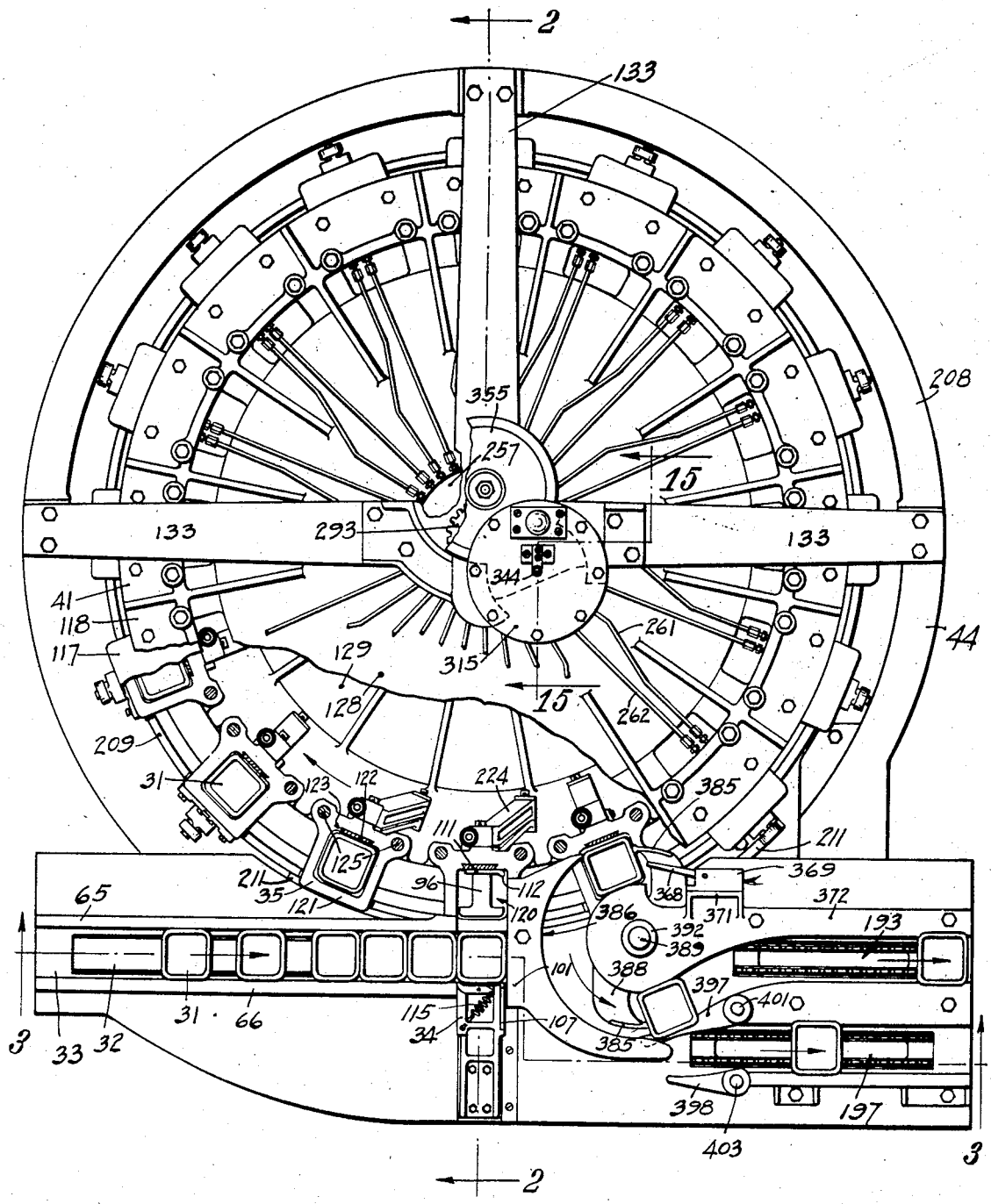
Figure 1 is a plan view of a can tester apparatus embodying the present invention; certain parts being broken away or removed.
Figure 13:
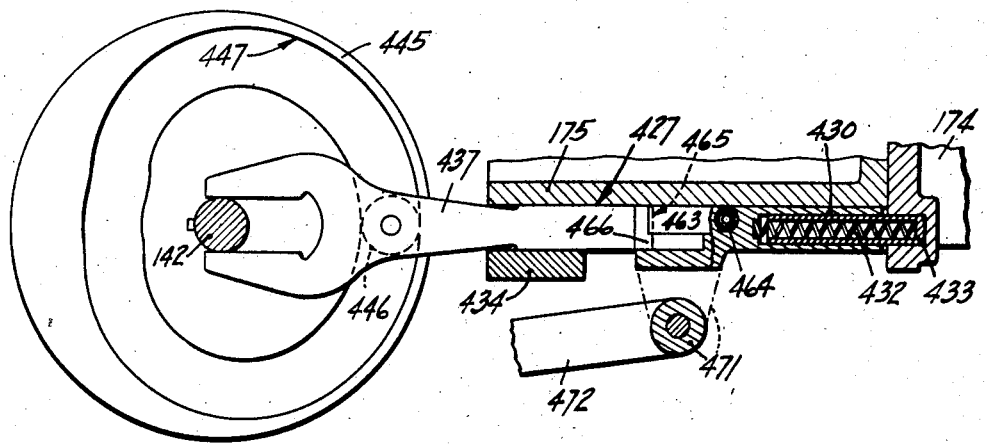
Figure 12:
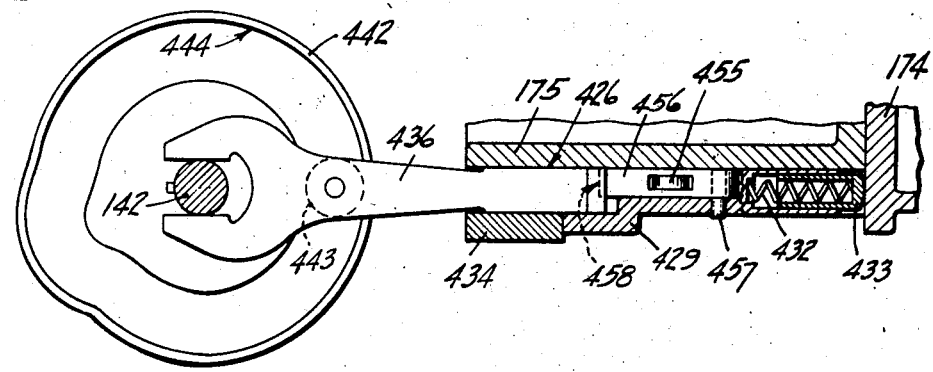
Figure 11:
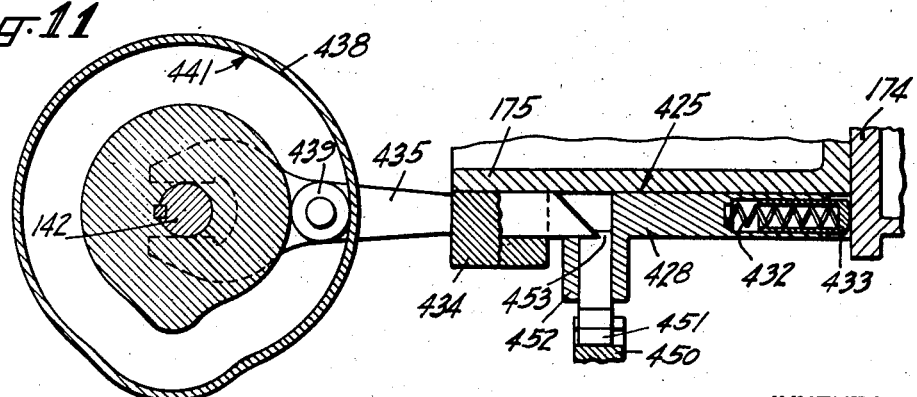

Figs. 11, 12 and 13 are plan sections taken at different levels of the delay mechanism as indicated respectively by the several broken section lines 11—11, 12—12 and 13—13 of Fig. 9;

Fig. 14 is a wiring diagram of a "jam detector" circuit included in the apparatus;

Fig. 15 is a vertical sectional view of a leak detecting mechanism of the apparatus taken substantially along the broken line 15—15 of Fig. 1;

Fig. 16 is a plan sectional view of the leak detecting mechanism as viewed substantially along the line 16—16 of Fig. 15;

Fig. 17 is a plan sectional view as indicated by the line 17—17 of Fig. 15, but with parts broken away;

Fig. 18 is a wiring diagram of circuits controlled by the leak detection mechanism;

Fig. 19 is a fragmentary plan sectional view taken substantially along the broken line 19—19 of Fig. 2 showing a can testing head unit in relation to an air distributing valve;

Fig. 20 is a vertical section taken through the unit and valve as indicated substantially by the broken line 20—20 of Fig. 19; and Figs. 21, 22 and 23 are fragmentary vertical sectional details of the distributing valve the sections being taken, respectively, as indicated by the lines 21—21, 22—22, 23—23 of Fig. 19.

Before entering into a detailed description of the various mechanism, which form a preferred embodiment of the invention, a brief and general description of the operations and functions of the testing apparatus will be given.

In the present organized apparatus, empty open mouth cans are fed along a substantially horizontal path and in vertical position with the open end uppermost throughout all operations. A can passes singly to one of sixteen testing pockets of a turret or carrier which rotates on a vertical axis. Each pocket is directly associated with or comprises a chamber which is formed around the can. Detection of a leaky can is effected while in the pocket by a master detector unit which is connected successively to each of the testing chambers at the end of each test period of a pocket.

This master detector unit functions through electrical and mechanical connections to deflect a leaky can, at a certain place in its path of travel, onto a "leaky can" conveyor. The position of deflection is not reached by the tested can immediately after the detector functions and a deflector delaying mechanism is preferably interposed between the detector and the deflector stations to provide the proper time interval. When a can is good the deflector is not moved from its normal position and the non-leaky cans are delivered onto a "good can" conveyor.

Referring now to the apparatus in detail as illustrated in the drawings, Figs. 1 and 3 show cans (designated by the numeral 31) as entering the machine on a belt 32. The upper run of this feed-in belt passes over a table 33 and carries the cans to a cam-operated pusher 34, see also Fig. 2, which inserts them singly and at regular timed intervals into testing pockets 35 of a constantly rotating turret carrier or spider unit 41. The table 33 extends across the front of the machine and is supported on pedestals 42, 43 (Fig. 3) bolted to a base 44.

The belt 32 is driven from a motor 45 (Fig. 3) which also constitutes the prime mover for all of the operating parts of the machine. The belt 32 takes over pulleys 51, 52 (Figs. 3, 5). Pulley 51 is pinned to a drive shaft 53 which is mounted in bearings 54, 55, 56 formed in the table 33. The pulley 52 is an idler pulley and is mounted on a fixed shaft 57 held in the table 33.

Upright walls 65, 66 (Figs. 7 and 8) are formed in the top of table 33 and extend above its surface as guides for the cans moving toward the pusher 34 on the belt 32. A short plate 71 (Figs. 2 and 3) provides a support for the forward can as it is being pushed along by the other cans which follow on the conveyor belt. When on the plate the forward can is in a position just in front of the can pusher.

The can pusher is reciprocated under normal operating conditions by action of a cam 75 (Figs. 3 and 5). This cam is provided with a groove 76 in which a cam roll 77 operates. This cam roll is mounted on a pin 78 set in the free end of a lever 81. The lever is pivotally mounted on a stud 82 fixed in the table 33 and is rocked back and forth by the action of the cam.

The resulting rocking motion is transmitted to a short arm 83 of a bellcrank lever 84 by way of a rod 85 which is yieldingly connected to the arm through a spring 86, the tension of which is adjustable. The bellcrank is pivotally mounted on a stud 87 set into the table. A long arm 91 of the bellcrank amplifies the small arcuate motion imparted by the cam, and through a link 92 pivotally connected to both the arm 91 and the pusher 34, the pusher is reciprocated in its slide ways, indicated by the numerals 93, 94.

At each forward movement of the pusher there is presented a testing pocket 35 of the turret and the pusher at such a time moves the forward can of the can line transversely of its former travel and places it on a T-shaped support 96 (Figs. 1, 2) constituting the bottom portion of the testing pocket. Such forward motion, however, does not take place if there are less than four cans in the line on the belt 32 at the time. The means for arresting the pusher action under such conditions is within a trip device mounted in a guide bracket 101 which is bolted to the table 33.

This trip device comprises a hanging latch 102 (Fig. 3) pivotally supported on a pin 103 mounted in the bracket. The latch is formed at its lower and free end with an extension 105 which projects through an aperture in the bracket 101. The latch when not engaged by a can rests against the bracket so that its center of gravity is to the right of a perpendicular dropped from its pivot point as viewed in Fig. 3. In this figure a can is shown as being stopped against the guide bracket 101. The pressure created by friction of the belt 32 against the bottom of the third and fourth cans (reading to the left) forces the first can into the position where it has rocked the latch on its pivot and has pushed its trip extension inwardly.

This inward or tripped position is maintained as long as the trip extension 105 is held in by the can which is for a portion of its transverse movement into the tester pocket (Fig. 8). When in the tripped position a latch plate 106 screwed to the latch is kept out of the path of a locking plate 107 carried on the side of the pusher 34.

The untripped position of these parts is shown in Fig. 7 wherein the latch plate 106 is squarely in line with and in the path of movement of the locking plate 107. Consequently, unless a can is in proper position to be fed into a tester pocket, the latch and locking plates strike each other as the can pusher starts forward and its forward movement is thereupon arrested, the spring 86 taking up the excess motion of the actuating mechanism. This yielding pusher feature is also an advantage to prevent damage to the machine should a jam occur in front of the pusher.

As a can is being placed on a testing pocket support 96, it is centralized by engagement with a stop plate 111 which is formed with a curled side edge 112 into which rides the rounded edge (designated by the numeral 113 in Fig. 4) of the can body 31. A centralizing lever 114 is pivoted on the front of the pusher 34 and is held lightly by a spring 115 against the back wall of the can. This spring held lever cooperates with the stop plate 111 to centralize the can and also assists in holding the can in the pocket when the movement of the testing turret sweeps the can from the receiving station and from the pusher 34.

Both the can support 96 and plate 111 are screwed to a vertical bar 116 (Figs. 2 and 20) constituting the inner wall of its associated test pocket 35. The top of each pocket is formed as a segmental head plate or testing head 117 (Figs. 1 and 2) bolted on the under side of a top ring 118 which forms the upper portion of the spider unit 41.

A can receiving test chamber 120 is associated with each pocket head and is positioned directly beneath the can as it rests on the support 96. This chamber is defined by a housing 121 which is preferably made to conform broadly in shape and size to the can being tested. This housing is vertically reciprocable and is adapted to be moved up and around the can resting on its support. When the chamber surrounds the can its walls are fairly close to the can walls thus producing a testing chamber having a minimum capacity. This provides a small volume of air in the chamber which is utilized during the testing operation as will be hereinafter fully described. Such small air volumes provide greater sensitivity in detecting leaks, particularly small leaks.

Each slide bar 116 is provided with beveled edges 122 (Figs. 4 and 5) which engage within dovetail grooves 123 formed in the inner wall of the chamber housing. This maintains a lower support for the slide bar during the movement thereover of the chamber housing. Two vertical guide posts 125 are provided as a guiding support for each chamber housing during its vertical movement (see also Figs. 1, 2 and 3). These posts are held at their upper and lower ends by threaded connection with the spider unit 41.

The spider unit 41 comprises two main sections, an upper spider 128 (Fig. 2) and a lower spider 129. Both of these spiders are held together to form the spider unit 41 by the vertical guide post 125. The spider unit is keyed to a vertical shaft 131 which is journaled at its lower end in the base 44 and at its upper end in an upper bearing bracket 132. This bracket is held from three sides by three arms 133 which are mounted on upright supports 134 bolted to and mounted on the base 44.

A large ring gear 135 is bolted to the bottom of the spider 129 (Figs. 2 and 3) and meshes with an idler gear 136 mounted on a stud 137 fixed in the base 44. The idler meshes with a small intermediate gear 141 which is keyed to a vertical cam shaft 142. This shaft is journaled at its upper end in the table 33 (Figs. 3, 5 and 9) and at its lower end in a bearing bracket 143 bolted to the base 44. The gear 141 is surmounted by a clutch gear 145 which meshes with a pinion 146 of the motor 45. A slip clutch 147 of any suitable well-known type may be interposed between the clutch gear 145 and the intermediate gear 141 to provide a safety drive for the apparatus. The clutch may have a spring 151 and an adjusting nut 152 to regulate the pressure at which the clutch will disengage. The spider is thus driven by the motor 45 through the gears 146, 145, 141, 136 and 135.

The motor drives both feed and discharge conveyors through the vertical shaft 142. A bevel gear 161 fixed on this shaft meshes with a bevel gear 162 pinned to a horizontal shaft 163 which is journaled in a bearing bracket 164 (Figs. 3, 5 and 9) bolted to the pedestal 43. A bevel gear 165 (Fig. 3) is pinned to the outer or right hand end of the shaft 163 and meshes with a bevel gear 171.

Gear 171 is carried by a short vertical shaft 172 journaled in bearings 173 formed in a bracket 174 which is bolted to a slide block 175 constituting the top section of the pedestal 43. The upper end of the shaft 172 carries a bevel gear 181 which meshes with the bevel section of a double gear 182 (Figs. 3 and 6). This double gear is also formed with a spur gear section 183. The combination double gear is fastened on a stub shaft 184 which is rotatably mounted in a bearing 185 formed in the table 33.

The spur gear teeth 183 mesh with a discharge drive gear 186 which is secured to a horizontal drive shaft 187 (Figs. 3 and 6). This shaft is journaled in bearings 188, 189 and 190 formed in the table 33.

Two dual sprocket units 191 and 192 are secured to the shaft 187 (Figs. 3, 4, 5 and 6). Two conveyor chains 193 also pass over a pair of idler sprockets 194. The latter rotate on a stub shaft 195 which is held in lugs 196 formed in the table 33. These conveyor chains 193 serve the cans which test as good cans as will be further described.

In a similar manner conveyor chains 197 are provided for the faulty cans or those which the tester will not pass as being good. Chains 197 operate over drive sprockets 192 and over a pair of idler sprockets 198. Sprockets 198 rotate on a fixed shaft 199 which is held in lugs 200 formed in the table 33.

The shaft 187 carries a bevel gear 201 (Fig. 6) which is pinned on the left end of the shaft. Gear 201 meshes with another bevel gear 202 (see also Fig. 5) which is mounted to turn with a long horizontal shaft 203 journaled in bearings 204, 205 formed in the table 33. A bevel gear 206 is held on the shaft 203 adjacent the bearing 205 and this gear meshes with a gear 207 which is secured to and which rotates with the drive shaft 53.

The various drive elements receiving motion from the motor 45 now having been disclosed, the description from now on will be particularly directed to the testing operations. These will be considered in some detail using the course of the can through the various operations as a focus and beginning with the can which has just been placed on a support 96 of the tester pocket 35. Since a can in every one of the sixteen testing units of the present embodiment of the invention passes through the same treatment, and since the construction and operation of all units are identical, but one of the units will be described and will suffice for all.

A circular shelf 208 (Figs. 1, 2 and 3) is formed as an integral part of the base 44 and surrounds the lower frame part of the machine. It is on this shelf that the pedestals 42, 43 and the upright supports 134 rest. The lower part of the spider 129 rotates adjacent to and inside of the shelf. This shelf constitutes the horizontal leg of what in cross section is a right angled member, a vertical wall of which provides an annular ridge cam 209.

Mounted on the shelf 208 and spaced a short distance from one another are two cam blocks 211 each having a vertical wall which provides a ridge cam 212. This vertical wall of each of the two ridge cams is concentric to and disposed just outside of the annular cam 209. The cams 209, 212 control the vertical movement of the chamber housings 121 which will now be described.

The lower edge of the spider 129 is formed with an annular lower rim section 213 which encircles the central axis of the testing turret. Beneath each chamber housing 121, the rim section 213 is enlarged into a horizontal hub 214 which provides a bearing for a rotatable shaft 215. A roller carrier 216 is fixed on the outer end of each shaft 215 and each carrier is formed with an outer lever 217 and an inner lever 218. The two levers cross each other at right angles.

The outer lever 217 carries outwardly and laterally projecting studs at its opposite ends on which cam rollers 219, 220 are rotatably mounted. In a similar manner each inner lever 218 is provided with inwardly projecting studs for rotatably supporting cam rollers 221, 222. The cam rollers 219, 220, as they are carried around with the rotating spider, successively pass over and in vertical alignment with the ridge cams 212 and are actuated thereby.

In the same way the cam rollers 221, 222 move along over and in vertical alignment with the continuous ridge cam 209 which coacts therewith. The total results of these cam actions are to slowly rotate each shaft 215 by means of which the chamber housing is raised and lowered and is held in its raised position for the can test and is also held in its lowered position while a tested can is discharged from the turret pocket 35 and a new can inserted. This will be more fully explained.

Each shaft 215 at its inner end carries a crank lever 223 which is pivotally connected to the lower end of a link 224. The upper end of link 224 is pivotally connected, by means of an inwardly projecting stud 225, to the upper end of the chamber housing 121.

When the can first enters the turret and is deposited on the can support 96 the chamber housing 121 is at its lowest position. At such a time the roller carrier 216 is in the position shown just to the right of the vertical center of Fig. 3 or in other words with the roller 219 at the lowermost point of the then vertical lever 217. The rollers 221, 222 which at that time are riding on a level track section of the cam 209 hold the carrier in such a position.

In the first section of travel of the testing head with its support 96 (from right to left in Fig. 3) from its can receiving position (can 31a is in alignment) the chamber housing 121 is slightly raised into the position shown in cross section at the left in Fig. 2. This insures positive confinement of the can and carries it away from the pusher 34 and away from the centralizing lever 114 which yields as the can moves past. This lifting action is brought about by the cam roller 219 riding up a rise in the cam track 212 of the cam block 211 which is shown on the left in Fig. 3. The cam 209 is notched out at this position as will be further explained.

This initial cam action rotates the roller carrier 216 a slight distance counter-clockwise as viewed in Fig. 3. Movement of the turret continues, however, and the roller 219 passes on up the further incline of the cam 212 the roller carrier 216 continuing to rotate counter-clockwise and the chamber housing continuing to rise.

During this counter-clockwise movement of the roller carrier 216 with its roller 219 rising, the leading back roller 221 is moving down a declining track 233 cut in the cam 209 at that position this being at the notched portion just mentioned. When the roller 219 reaches the peak of its cam track, the roller 221 comes to the lowest place in the trough of its cam depression. The chamber housing at such time is about half way up.

The remaining lift of the chamber housing is brought about by the continued turning of the roller carrier 216 in the same direction this being directly effected by the roller 221 passing from the trough of the declining track section 233 of the cam 209 and riding up on a continuing upwardly inclined track portion 234 of the cam.

In the meantime the roller 219 is lifted clear of the cam block and the opposite roller 220 is brought down on the ridge cam 212. As soon as the roller 221 reaches the upper level of the cam 209 both rollers 221, 222 being then level ride along the horizontal cam ridge and keep the carrier block locked against rotation. This locking is during the can testing period for that particular testing unit.

This uppermost position of the chamber housing 121 is reached in about 25 degrees of travel of the turret and of the testing head now being considered. The dotted lines in Fig. 20 show this upper testing position of the chamber housing, the can being then confined within the testing chamber 120.

The bottom of the chamber housing 121 is formed with a pair of upwardly extending spaced pads 245, 246 (Figs. 2 and 5) which vertically are disposed on opposite sides of the leg of the T support 96. As the rising chamber housing 121 nears the end of its upward movement the pads 245, 246, straddling the support 96, engage and lift the can from the support and insert its open end over a centering pilot block 247. The block 247 is secured to the segmental head plate or testing head 117 and may be said to constitute a unitary depending portion of the testing head.

This upward movement of the can brings its open mouth flange against a rubber sealing ring 251. The sealing ring is located in an annular recess 252 which is formed in the head plate 117 as shown in Figs. 19 and 20. The ring is held in place by the pilot 247. In this sealed can position, the pilot also backs up the open mouth of the can thus protecting it from possible distortion.

At substantially the same time that the can is thus being sealed the open end of the chamber housing 121 is likewise being closed. The top edge of the housing engages a sealing ring 253 which seals off the chamber 120. The sealing ring 253 is held in an annular recess 254 of the head plate 117 and by a clamp ring 255 bolted to the head.

Both can and chamber being thus sealed the same are ready for the actual testing operation. The greater the air used in the can, the finer the leak which will be detected in the testing operation. The first step in such operation therefore is admitting air to the interior of the can. This is done by way of an air distributor which is located at the center of the can testing turret. For one condition of test 12 pounds of air may be used.

The distributor is mounted upon and is supported by the upper spider 128 of the testing turret and surrounds the upper end of the vertical shaft 131. It comprises a non-rotatable air receiving member or valve disc 257 (Figs. 2 and 17) which has a slow planetary movement relative to the testing turret. This disc is formed with an enlarged hole 258 in which an upwardly extending hub part 259 of the upper spider 128 is loosely located. This hub is formed centrally of the top horizontal web of the upper spider as shown in Fig. 2.

The valve disc 257 rests upon and is in face to face contact with a circular member 260 which surrounds the hub 259 of the rotating spider 128 with which it is secured. This member is, therefore, a rotating element and constitutes a central unit from which air lines radiate to each of the testing heads. Two air pipes 261, 262 (Figs. 1 and 19) extend between the circular member and each testing head and provide for the passage of air to and from the latter. The pipes 261, 262 communicate with certain connecting or registering internal bores and ports formed in the testing head and in the distributor and certain of the passages in the member 260 register periodically with similar openings in the disc 257, this constituting a timed valve action for the testing cycle.

A right angled air passage 263 formed in the disc 257 leads the air coming to the distributor, as from a suitable supply tube 264, to an oblong channel 265 (Figs. 19 and 21) in the lower face of the disc. This provides that air under pressure is always in the channel as long as the air supply is uninterrupted which is normally during the operation of the machine.

During one complete revolution of the tester turret, which is one complete rotation of the rotating member 260 turning relative to the disc 257, each sealed can 31 within its chamber 120 is supplied with air by way of a right angled port 266 which comes into register with the channel 265 and which is cut in the periphery of the rotatable member (see also Fig. 20). This port leads to the inner end of the pipe 261 for the individual testing head. The outer end of each pipe 261 communicates with a port 271 located in the segmental plate 117 and the incoming air passes by way of the port 271 through a bore 273 on into the sealed can. Bore 273 extends vertically through the pilot block 247.

It will be understood that this passage of air from the supply tube 264 by way of the air pipe 261 and into the can is effected while the individual port 266 of a particular testing head is passing the oblong channel 265. The channel 265 is of sufficient length, in the direction of movement of the successive ports passing by, to allow an adequate time for the proper filling of the can to the desired pressure.

During and following the time that air is flowing into the sealed off can, which in many cases actually expands the can, the sealed off space around the can and within the chamber 120 is vented to the atmosphere. This insures that the chamber at the beginning of the actual test period is positively at atmospheric pressure. This is done by way of the pipe 262 (Figs. 1 and 19). The inside of the chamber at the top communicates with a vertical port 275 formed in the head plate 117 (see also Fig. 20) and the port connects with the outer end of the pipe 262 by way of a horizontal passage 276. The inner end of the pipe communicates with a right angled port 277 (Fig. 22) formed in the valve member 260. When venting the top of the port is passing under an oblong channel 281 cut in the disc 257. This channel is always open to atmosphere being located at the bottom end of an open top vertical hole 282. The reason for putting the interior of the can under pressure above atmosphere and the interior of the surrounding chamber at atmospheric pressure will be more apparent as the description proceeds.

The flat contacting surfaces of the valve disc 257 and the rotating member 260 both of the air distributor are necessarily in airtight movable contact, this being effected by accurate surfacing of the contacting parts. In order to maintain this tight fit and prevent scratching and localized wearing, provision is made for eccentrically moving the valve disc relative to the center of the shaft 131 to produce the slow planetary movement of the former previously mentioned. A slight circular rubbing action results between the contacting surfaces which polishes the same and produces a nicely lapped joint.

This planetary motion is given to the disc 257 through the action of gears 291, 292 (Figs. 2 and 16) which mesh with a central gear 293 bolted to the upper end of the spider shaft 131. Integrally formed stem shafts 295, 296 of the respective gears 291, 292 are journaled in the bearing bracket 132 on opposite sides of the spider shaft 131. The lower ends of the stem shafts 295, 296 project below their bearings where they are formed with eccentric extensions 305, 306 (see also Fig. 17).

The extension 305 projects into a hole formed in a slide block 307, this being a loose fit as the extension turns in the hole. Block 307 is mounted for free sliding movement in a radially disposed groove 308 cut in the upper face of the disc 257. The extension 306 projects into and loosely fits a hole sunk in the disc. The rotating stem shafts 295, 296 cause the extensions to describe small circles as they rotate within their seats and this imparts a slightly oscillating or planetary motion to the disc. The necessary radial compensation is made by the sliding of the block 307 within its groove, the enlarged hole 258 in the center of the disc being sufficient to prevent interference with the spider hub 259.

When the port 266 passes the channel 265 the air under pressure in the can is sealed off and then the vent port 277 passes beyond the channel 281. The chamber 120 is now sealed off at atmospheric pressure. This constitutes the beginning of the testing time. The testing period extends over about 270 degrees of rotation of the spider. During this time if a good can is under test its air remains locked and none passes into the chamber space around the can.

A leaky or bad can will lose air which will pass from the interior of the can through the leak and into the chamber 120. Since each chamber is always at atmospheric pressure at the beginning of the test, air leaking from the can will augment this pressure. A diaphragm control detector 315 (Figs. 1 and 15) is used to electrically and mechanically translate this pressure change into a subsequent ejection of such a leaky can. The detector shown in the drawings and briefly described herein is similar in construction to that shown in the Magnus E. Widell Patent No. 2,019,517 issued by the United States Patent Office on November 5, 1935.

Detection of can leakage is made when the port 277 in the upper face of the moving valve member 260 passes under an elongated channel 321 (Figs. 17, 19 and 23) cut in the lower face of the disc 257. The augmented chamber space air thereupon is free to pass through the port 275, passage 276 in the head 117, through the pipe 262 and port 277 into the channel 321 from whence it then enters a vertical hole 322 (see also Fig. 15) extending through the disc. A flexible tube 323 provides a connection between the disc hole and a hole 324 which extends through a stem 325 of a stationary detector valve part 326 of the detector 315. A flange 327 (see also Fig. 16) of the valve part is maintained hermetically sealed within the walls of a close fitting recess 328 formed in a lower disc housing 329 of the detector 315.

The detector is provided with a centrally disposed diaphragm 331 which is held in flexing position between the lower disc housing 329 and an upper disc housing 333. The periphery of the diaphragm is clamped between peripheral ledges 334, 335 formed in the upper and lower disc housings this being an hermetically sealed joint maintained by bolts 336. This construction provides an upper detector chamber 337 and a lower detector chamber 338 on opposite sides of the diaphragm.

The air in the upper chamber is always at atmospheric pressure the upper disc housing 333 being open at the top. The hole 324 in the valve part stem 325 opens up into the lower chamber 338 and this latter chamber therefore will contain an air pressure which will vary in accordance with the test. The air connection between the testing head chamber 120 and the diaphragm chamber 338 is periodically made as just described so that in the case of a good can the air in both chambers will be at atmosphere. This constitutes normal and the normal position of the diaphragm 331 is then half way between the housing walls as shown in Fig. 15.

The augmented air pressure coming from a testing chamber of a leaky can, therefore, will be greater than atmosphere and this circumstance will raise the diaphragm from its normal position. The flexing diaphragm lifts a contact element 343 which is carried in the center of the diaphragm. The contact element extends above the disc housing 333 and when lifted by the flexing diaphragm electrically engages a fixed contact element 344 which establishes a short circuit associated with the discharge of a leaky can which will be later described. The element 344 is adjustably mounted on and insulated from the detector housing 333.

It only takes a moment for the air in a test chamber 120 to influence the position of the diaphragm by way of the detector chamber 338 as just described and when the port 277 has passed the channel 321 the port is again sealed off locking the air in both test and detector chambers. A right angled port 346 (Figs. 19 and 21) is formed in the distributor member 260 for each testing unit and is located in a radial line with the port 266. The vertical leg of the port 346 now moves under the channel 321 (see also Fig. 23) and communication with the atmosphere is set up by way of the port thus venting in part the diaphragm chamber 338 and also venting the passageways leading up to the diaphragm.

The sensitive nature of a testing operation is dependent in large part on avoiding the unnecessary use of large volumes of air. The ports previously described are made small and with a minimum of air carrying capacity. With such small ports, therefore, venting of the chamber 338 is not sufficient for high speed testing and accordingly provision is made for additional chamber venting as by cam controlled valve action. This valve action utilizes the stationary valve part 326 (Figs. 15, 16) set in the lower disc housing 329. A cooperating movable flanged valve member 349 is rotatably mounted on the stem 325 and is provided with vent holes 350. The upper flat surface 351 of the movable flanged member 349 is forced against the lower flat surface of the stationary flange 327 and in airtight contact therewith, by a spring 353 which is backed by a nut 354 screwed onto a threaded portion of the stem 325.

For venting by this means, the member 349 is rotated on the stem of the part 326 by motion imparted to it from a cam 355. A cam roller 356 rotatably mounted on one end of a lever 357 operates within a groove 358 formed in the lower face of the cam 355. The lever is thereby rocked on a stud 359 which is mounted on a boss projecting from one side of the bracket 132. To the opposite end of the lever 357 a link 360 is pivotally mounted and the other end of the link is pivotally connected with an arm 361 formed integrally with the valve member 349. By this mechanism the chamber is vented, the member 349 being rotated at the proper instant to align its vent holes 350 with other vent holes 362 formed in the flange 327.

As the test pocket 35 with its tested can passes beyond the detecting position, the chamber housing 121 is lowered and the descending spaced pads 245, 246 thereupon lower the can to its rest on the support 96 (Fig. 20). This is effected by a repetition of one complete rotation of the roller carrier 216 (Fig. 3) this time being actuated by the second cam block 211 (shown to the right of the center line in Fig. 3).

In this return movement, the first 90 degrees of rotation is effected by a rise 363 formed in the ridge cam 212 which turns the roller carrier by engagement with the roller 220. Adjacent this track difference of the cam 212 the cam 209 is cut away in a declining track portion to allow for clearance and descent of the roller 222. At the completion of half of the return movement of the roller carrier (90°) the inner lever 218 is in vertical position with its cam roller 222 at the bottom and roller 221 at the top.

The second half of the return rotation of the carrier 216 (completing 180° of the total rotation) is accomplished through the cam roller 222 being acted on by an inclined slope 364 formed in the cam 209 this being located in the cam clearance just mentioned. At the completion of this movement the roller carrier is locked against rotation by cooperation between the level portion of the cam 209 and the rollers 221 and 222. This returns all of the parts to the positions they assume when a testing pocket is presented to receive a can.

By the time the chamber housing 121 has reached its low position the tested can within the testing pocket 35 has been brought around by the continued rotation of the turret to a place of discharge. If the can has moved down on the support 96 in a proper manner it will leave the turret pocket without any interruption in its travel. Provision is made, however, for stopping the machine should the can stick on the pilot block 247 instead of again returning to its lowered position on the pocket support. This is done in the following manner.

Where the can has properly resumed its lowered position on the support 96 it passes under an arm 368 (Figs. 1, 3 and 4) of an electric switch 369 without moving the arm. This switch is attached to a bracket 371 formed in a can guide plate 372 bolted to the table 33. The arm projects in the path of the can and the pilot block 247 moves over the arm. As will be observed by referring to Fig. 20, the space between a properly lowered can and the pilot block it has just left is very small but it is through this space that the switch arm passes.

If a can is not fully lowered therefore it strikes the arm. When the arm is thus engaged, the switch 369 is opened and the machine is stopped. Fig. 14 shows diagrammatically how this is done and it will be observed that the driving motor 45 of the apparatus is electrically operated as from a generator 375, the current from which flows through a wire 376, one side of a double pole switch 377, wire 378, the switch 369 which is normally closed and wire 379 to the motor 45.

The return side of the circuit is made through wire 381, the other side of switch 377 and a wire 382 back to the generator. Opening of the switch 369 by the improperly positioned can therefore breaks this circuit and thus stops the motor 45 and the operations of the machine.

In the normal progress of the can, it is ejected from the testing pocket by one of two ejector arms 385 (Figs. 1 and 4) cooperating with a circular guide rail 386 formed in the bracket 101. All tested cans if properly lowered are thus returned to the table 33. The ejector arms are formed as integral ridges on the upper surface of a turret 388 (see also Fig. 9) which is mounted on a vertical shaft 389. This shaft extends below the turret where its lower end is journaled in a bearing 391 formed in the table 33. The upper end of the shaft above the turret is journaled in a bearing 392 formed in the guide plate 372.

The shaft 389 and its turret 388 is continuously rotated by a geared connection with the vertical cam shaft 142 (Figs. 4 and 9). For this purpose a pinion 395 is secured to the top end of the shaft 142 and meshes with a gear 396 which surrounds the shaft 389 and is preferably attached to the base of the turret.

All cans returned to the table 33 are swept around a circular path of travel through about 180 degrees being held to their course between the spaced walls of the guide members 372, 386. The rotating turret 388 is the propelling force. At the end of such movement the good and leaky cans are separated, the latter being switched into the leaky can conveyor 197 while the good cans pass into the conveyor 193. This switching is done by means of a horizontally disposed double deflector device consisting primarily of a long deflector arm 397 and a cooperating short track arm 398.

These arms move substantially in parallel, Fig. 1 showing the good can setting, this position being also indicated in dotted lines in Fig. 4. The full line position of the arms shown in Fig. 4 shows their position when ejecting a leaky can from the turret arm 385.

The deflector element 397 is secured to the upper end of an oscillating shaft 401 (Figs. 4 and 9) which is mounted in a bearing 402 formed in the table 33. The track arm 398 is secured to the top of a short oscillating shaft 403 (Figs. 4 and 5) which has movement in a bearing 404 formed in the table 33. Both of these deflector elements are connected together for joint movement, a connecting link 405 uniting the outer ends of short arms 406, 407 secured to the respective shafts 401, 403. This provides the parallel or joint movement already mentioned.

Mention has already been made of a short circuit associated with the discharge of a leaky can which during its test period caused the diaphragm contact element 343 to engage with the fixed contact 344. The effect of such short circuiting is immediately or at the time of test to deenergize a solenoid. The can which has just been tested, however, has some distance to travel before it is ready for sorting or separation as a leaky can. The deflector delaying mechanism only briefly referred to provides for the necessary timing. The actuation of the solenoid constitutes the first move in a series of movements which now takes place as functions of the delaying mechanism.

The amount of time delay is sufficient to allow the tested and leaky can to be reseated on the support 96, to allow the chamber housing 121 to be brought down to its lowermost position and to permit the ejection of the can from the turret pocket and its circular travel under the propelling action of the turret arm 385. At the end of the delay period the deflector parts 397, 398 are moved or switched into the position shown in Fig. 4, this being done just before the can reaches that position. After the deflector parts are so set the leaky can which continues without pause in its travel is switched onto the leaky can conveyor.

For all of the cans which are good in the test, the solenoid is not deenergized and the delay mechanism is not brought into action. Preparatory to a detailed description of the delay mechanism consideration will first be given to the solenoid and to its electrical circuit. Reference should now be had to the wiring diagram of Fig. 18.

As long as the cans are good current flows in a closed solenoid circuit from a source of electrical power such as a generator 410 along a wire 411 to one side of a double pole switch 412, a wire 413, a lamp 414, a wire 415 through the coil winding of the solenoid just referred to. This solenoid is indicated by the reference numeral 416 and the opposite side of its winding connects with a wire 417 which is grounded to the machine.

A second wire 418 is also grounded to the machine and by means of the ground is normally electrically connected with the wire 417. The wire 418 connects through the opposite side of the double pole switch 412 with a wire 419 which forms the returned wire to the generator 410. As long as current flows along this circuit the solenoid 416 is energized and the resistance of the solenoid coil is such as to permit only a relatively dim illumination of the lamp 414 which is in the solenoid circuit.

When the short circuit is produced by the closing of the contacts 343, 344 this forms a short cut for the electrical energy of the generator 410 which does not have the coil resistance of the solenoid 416 which is in the solenoid circuit. The contact 343 is grounded and this short circuit flows from the generator 410 by way of the wire 411, switch 412, wire 413, lamp 414 and a wire 421 into the fixed contact 344. Current then passes through the contact 343 by way of the ground to the wire 418 and then by way of the switch 412 and wire 419 to the generator. It will be observed that this passage of ground current between the wire leading from the contact 343 and wire 418 cuts out or shunts the solenoid coil winding. There being less resistance the lamp 414 burns brightly giving a visual indication of the presence of a leaky can.

The base of the solenoid 416 (Figs. 5 and 10) is secured to a support pad 423 formed in the bearing bracket 164. The solenoid is of the usual spring pressed type in which its armature under the action of the spring projects beyond the solenoid body. The armature is drawn back into the coil and against the action of the spring when the solenoid is energized.

The deflector delaying mechanism comprises broadly three sets of slide latch devices associated with the same number of cam actuating yoke slide elements. The effect of the projecting of the solenoid armature upon deenergizing of the solenoid 416 is to latch together the first slide latch unit of the delay mechanism and its actuating yoke. The first latch unit is thereupon moved and this movement provides a latching of the second or intermediate slide latch element with its cam actuating yoke device resulting in movement of the second slide latch element. The intermediate slide movement in its turn provides latching of the third slide latch section so that it is actuated by its cam yoke to move and thereby oscillate the deflector arm shaft 401.

The three slide latch devices of the delay mechanism are best illustrated in Figs. 3, 9 and 10 and are located within the slide block 175. The cam actuating yoke members together with their slide latches are shown in detail in Figs. 11, 12 and 13 and these are operated from the cam shaft 142. The slide block 175 is formed with three horizontal channels which provide a lower slideway 425, an intermediate slideway 426 and a top slideway 427. In the three slideways are mounted for lateral movement the respective slide latch units which are a lower unit 428, an intermediate unit 429 and a top unit 430 all of which are retained in sliding position by gibs 431.

Each latch unit 428, 429, 430 when not shifted by its corresponding yoke member is held in its normal non-latch position by means of a spring 432 partially confined within a spring barrel 433. Each spring barrel is disposed in a bore formed in one end of the unit. The spring barrel is backed up by the bracket 174 and the slide held thereby is in its left position (Fig. 9) where its left end engages a stop plate 434 bolted to the face of the slide block 175.

Corresponding respectively with the latch units 428, 429, 430 are a lower yoke member 435 (Fig. 11) an intermediate member 436 (Fig. 12) and an upper yoke 437 (Fig. 13) all of which extend into and slide within the left ends (Fig. 9) of the slideways 425, 426, and 427. The opposite end of each yoke member is yoked or slidably positioned over the shaft 142.

The shaft end of the lower yoke 435 (Figs. 9 and 11) moves under an inverted face cam 438 keyed to the shaft 142 and carries a cam roller 439 which operates in a cam groove 441. In like manner the intermediate yoke 436 moves over a face cam 442 (Figs. 9 and 12) also keyed to the shaft just above the lower cam and its cam roller (numbered 443) operates in a cam groove 444. The upper yoke 437 rests on an inverted face cam 445 (Figs. 9 and 13) which is keyed to the shaft and a cam roller 446 mounted on the yoke operates within a cam groove 447 of the cam.

It will be recalled that the shaft 142 makes one revolution each time a new can is fed into the testing pocket. Each yoke member therefore slides into the corresponding slideway of its latch unit for every revolution of the shaft. This is a free non-actuating movement, however, unless or until a leaky can starts the progressive latching of the latch units.

Since the time corresponding to one revolution of the shaft 142 is required to effect a sliding movement of each latch unit 428, 429, 430 it follows that three complete revolutions of the shaft 142 are needed before the first latch action (brought on by the solenoid 416) is transmitted to the switch arm shaft 401. This produces the necessary time delay and a closer consideration of the various latch details is now in order.

The armature of the solenoid 416 (Figs. 10 and 11) is connected in a tongue and groove joint 450 to a laterally disposed latch block 451 sliding in a boss 452 carried on the latch unit 428. When the armature is projected (by short circuit of its solenoid) the latch block is moved into the position of Fig. 11 where notched end 453 is in the path of an angular nose at the end of the lower yoke 435. This is the first latched position and upon movement of the actuating yoke the latch slide unit 428 moves right (Figs. 9 and 11) toward the bracket 174. This is the first of the latch movements.

The lower latch unit 428 carries a vertically disposed finger 454 (Fig. 9) which projects up through a clearance opening cut in the slide block 175 between the lower and intermediate slideways 425, 426. As this finger is moved it engages and lifts a roller 455 carried centrally of a latch lever 456 (Figs. 9 and 12) which is pivotally mounted at one end on a pin 457 carried by the intermediate latch slide unit 429.

The free end of the latch lever 456 is thus raised and a notch 458 formed in this end is brought into the path of an angular nose formed on the end of the intermediate yoke 436. This is the second latch position. A spring pressed barrel 459 is set into the bottom of the latch unit 429 and engages the latch lever and holds it down in non-latched position except when the finger 454 holds the roller 455 and its latch lever 456 in position for engagement by the intermediate cam yoke 436. Upon movement of the latter the intermediate latch slide unit moves right (Figs. 9 and 12).

The intermediate latch unit 429 carries a vertically disposed finger 461 (Figs. 9 and 13) which operates in the same manner as the finger 454. It also extends up through a clearance opening, this time between the intermediate and top slideways 426, 427, and when moved with the slide engages and lifts a roller 462 and also a latch lever 463 on which the roller is mounted. Latch lever 463 is pivoted on a pin 464' carried on the top latch slide unit 430 and is normally held in lowered unlatched position by a spring pressed barrel 464 except when raised by the finger 461 into this, the third latched position.

The free end of the latch lever 463 is notched as at 465 and when the top cam yoke 437 moves in, an angular nose 466 engages the notch and the top latch slide unit 430 moves. This is the movement which takes place just before the leaky can reaches the switch elements 397, 398 and which is after the desired delay as already fully explained.

The top slide unit 430 carries a lug 471 which projects out in front and provides a pivotal connection for a pair of parallel links 472 the other ends of which are pivotally connected with a short arm 473 which is preferably an integral part of the arm 406 and is thus carried by the oscillating shaft 401. Each time the top latch unit moves, therefore, the shafts 401, 403 (Figs. 4 and 5) are turned so that the can deflector device 397, 398 is positioned to guide the leaky can into its proper discharge conveyor 197.

By reason of the relative positions of the cam grooves of the different cams 438, 442 and 445, each latch unit movement takes place in progressive order following the first latching of the parts 428, 435 of the lower elements in the delay mechanism without any interference one with the other. For example should there be two or three leaky cans in direct sequence, there would be one revolution of the shaft 142 when there would be a movement for two or for all of the latch units 428, 429, 430.

In the case of the three leaky cans, by way of example, the top unit 430 would be moving as the result of the test on the first can, the intermediate unit 429 as the result of the test on the second can and the bottom unit 428 as the result of the third can tested. However, the movement of the top unit is completed by the time the intermediate unit moves and this latter terminates in time for the actuation of the lower unit. This relative cam travel is shown by a comparison of Figs. 11, 12 and 13 wherein the various cams are in the same cycle of time revolution of the shaft 142.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can testing machine, the combination of a testing head arranged to move through a predetermined path during a testing cycle, feeding devices for conveying upright open top cans to said head to be tested, a movable housing disposed beneath said head and forming a testing chamber therein, means for conjointly raising said can to seal its open top against said testing head and for raising said housing about said can and into sealing relation with said head with the can confined therein, instrumentalities for testing a confined can for leaks while against said testing head, and means for separating leaky and non-leaky cans as determined by said instrumentalities.

2. In a can testing machine, the combination of a travelling testing head having a depending pilot block adapted to enter and position a can under test, feeding devices for conveying upright open top cans to said head to be tested, a housing located beneath said block and having vertical movement into engagement with said head to form a testing chamber, means for conjointly raising said can for sealing the open top of a can around said block and against said head and for sealing said testing chamber with the can confined therein, instrumentalities for testing a confined can for leaks while on said testing head by filling the interior of the can with air under pressure in excess of atmosphere, and means for separating leaky and non-leaky cans as determined by said instrumentalities.

3. In a can testing machine, the combination of a testing head having air ports, a vertically movable housing having an open upper end located beneath said head and adapted to form a testing chamber, means cooperating with said head for sealing the open top of an upright can in position to be tested, means for sealing the open top of said testing chamber with the can confined therein and engaging said testing head, a said air port of the head opening into the sealed top of the confined can and another said air port opening into the sealed top of said chamber outside of said can, means for introducing air under pressure for testing into said can by way of its head port, means for venting said chamber to atmosphere by way of its said port prior to testing, instrumentalities controlled by the actual air pressure in said chamber port following the test period for determining if the can tested is a leaky or a non-leaky can, means for removing tested cans from said testing head, and means for separating leaky and non-leaky cans as determined by said instrumentalities.

4. In a can testing machine, the combination of a testing head, feeding devices for conveying upright open top cans to said head to be tested, can trip elements located adjacent to said feeding devices for preventing improper delivery of cans to said head, a vertically movable housing located beneath said head and adapted to form a testing chamber for the can while being tested, means for raising said can to seal its open top against said testing head and for raising said housing about said can the while sealing said testing chamber with the can confined therein, instrumentalities for testing a confined can for leaks while against said testing head, sorting means for separating the leaky and non-leaky cans as determined by said instrumentalities, and timing devices for delaying the separation of said cans by said sorting means while the tested can is being removed from said testing head by said feeding devices.

5. In a can testing machine, the combination of a rotatable turret, a plurality of testing heads carried by said turret, a vertically movable housing located beneath each testing head and adapted to form a testing chamber, means cooperating with each testing head for sealing the open top of an upright can to be tested and for sealing said testing chamber with the can confined therein by raising said housing to cause it to move up to surround said can and then lift the same into sealed position, instrumentalities for testing a confined can for leaks while sealed relative to its testing head, sorting means actuated by said testing instrumentalities for separating leaky cans from cans that do not leak, means for removing a tested can from said testing head, and timing devices for delaying the action of said sorting means to separate said leaky and non-leaky cans, while the tested can is being removed from said testing head.

6. In a can testing machine, the combination of a rotatable turret for conveying open top cans in an upright position through a testing operation, a plurality of testing heads and vertically movable can receiving pockets carried by said turret, feeding devices for positioning a can to be tested above a said turret pocket, conjointly operable means for raising and sealing the open top of the positioned can against its said testing head and for raising a pocket into sealing position against said head with the can confined therein, instrumentalities for testing the confined can for leaks while carried with said testing head, means for breaking the can and chamber seals and lowering said can, discharging devices for removing a tested can from said turret, and means actuated by said testing instrumentalities for deflecting leaky cans from those that do not leak.

7. In a can testing machine, the combination of a testing head, a housing normally located beneath said testing head, means cooperating with said head for raising said housing and sealing the open top of an upright can to be tested, said raised housing providing a surrounding sealed testing chamber with the can confined therein, means for introducing air under pressure into the interior of said sealed can, means for bringing said sealed testing chamber to atmospheric pressure preparatory to testing the can, means for holding both can and chamber pressures for a testing period, instrumentalities actuated by increase of pressure within said testing chamber as caused by leakage of air from a leaky can for detecting such leaky can, means for removing a tested can from said testing head and said chamber, and means for stopping operation of the machine in the event said tested can is not properly removed from said testing head.

8. In a can testing machine, the combination of a carrier having rotation on a vertical axis and adapted to convey cans in an upright position through a testing cycle, testing heads mounted on said carrier, a vertically movable testing chamber located beneath each testing head, each chamber being open momentarily when in a lowered position to receive a can to be tested and to discharge the tested can, feeding devices for positioning a can under a said testing head and within its associated chamber, means for sealing the can against its head and for also sealing said chamber by raising both can and chamber, instrumentalities for testing the confined can for leaks while so sealed within said testing chamber, discharging devices for removing a tested can from said carrier, sorting means actuated by said instrumentalities for separating leaky cans from those which do not leak, and timing devices for delaying the action of said sorting means while said tested can is being removed from said testing head.

9. In a can testing machine, the combination of a testing head, a vertically movable housing having an open top when in lowered position, means for sealing the open top of an upright can to be tested on said head, means for raising said housing and sealing its open top against said head to provide a surrounding sealed testing chamber beneath said head and confining the sealed can, means for introducing air under pressure into the interior of said confined can, means for bringing said sealed testing chamber to atmospheric pressure preparatory to testing the can, an air pressure detector having two balancing air chambers both chambers being set at atmospheric pressure preparatory to testing the can, and means operative subsequent to a testing period for connecting one of said detector chambers with said can testing chamber to determine if air has leaked from the interior of said can into said testing chamber during the test period.

10. In a can testing machine the combination of a movable carrier having a plurality of testing heads for receiving and testing cans, feeding devices for positioning cans individually in alignment with and beneath said heads, means for raising and sealing a can on its head, a movable housing disposed beneath a said head and vertically movable into engagement therewith to provide a sealed testing chamber surrounding said can so as to confine each sealed can, an air pressure detector mounted adjacent to said carrier, said detector having two air chambers separated by a flexible diaphragm, valve means for quickly venting a said air chamber of the detector to atmosphere, means for creating an air pressure difference between the interior of said sealed can and the interior of said surrounding chamber preparatory to testing the can for leaks, air conducting means for subsequently connecting said testing chamber with said vented detector chamber to determine by the position of said diaphragm if the tested can leaks, and sorting means operable by said diaphragm when moved by leaky can air from said testing chamber for separating the tested leaky cans from the tested non-leaky cans.

11. In a can testing machine, the combination of a testing chamber, a testing head having a depending pilot block, feeding devices for conveying upright open top cans to said head to be tested, means for positioning the upper open end of the can over said pilot block while sealing the can against said testing head and within said testing chamber, means for sealing said testing chamber surrounding said sealed can, instrumentalities connecting with said chamber for testing the confined can for leaks, means for removing said can from said pilot block after testing, and safety means for stopping operation of the machine if said tested can is not properly removed from said pilot block.

12. In a can testing machine, the combination of a testing head for receiving a can to be tested, means for sealing said can on said head, means for creating higher than atmospheric air pressure within said can, means for surrounding said can with a testing chamber, means for sealing said testing chamber, instrumentalities for testing a confined can by detecting leakage of air between the interior of the can under test and the testing chamber, sorting means for separating leaky and non-leaky cans as determined by said instrumentalities, and a progressively actuating timing device having a plurality of interhooked sliding elements interposed between said instrumentalities and said sorting means, the first sliding element of the timing device being actuated by a detected leaky can and the last sliding element operating elements in said sorting means, the delayed time for such actuation providing for proper removal of the tested can from said testing head.

13. In a can testing machine, the combination of a testing head, means for sealing the open top of an upright can to be tested with said head, means for providing a small capacity sealed testing chamber surrounding the can and having a similar shape said testing chamber being formed by raising a housing around the can and by sealing the open end of the housing against said testing head, means for introducing air under pressure into the interior of said confined can, means for bringing said sealed testing chamber to atmospheric pressure preparatory to testing the can, an air pressure detector having an air chamber of small capacity which is adapted to be set at atmospheric pressure preparatory to testing the can, means utilizing a minimum air capacity and operative subsequent to a testing period for connecting said detector chamber with said can testing chamber to determine if air has leaked from the interior of said can into said testing chamber during the test period, and venting means utilizing large air capacity for quickly venting said detector chamber following such testing operation.

14. In a can testing machine, the combination of a testing head, feeding devices for conveying open end cans to said head to be tested, a housing disposed adjacent said head and adapted to form therebetween a testing chamber, means for moving the open end of said can and said testing head into engagement to seal the open end of said can against the latter, conjointly operable means for elevating said housing to enclose said can and provide a testing chamber with the can confined therein, instrumentalities for testing a confined can for leaks while sealed against said testing head, means for separating leaky and non-leaky cans as determined by said intrumentalities, and means for delaying the separation of said cans while the tested can is being removed from said testing head by said feeding devices.

WILLIAM W. MAHER.